US006764044B2

(12) United States Patent
Kusic

(10) Patent No.: US 6,764,044 B2
(45) Date of Patent: Jul. 20, 2004

(54) AIRPLANE SPIRALLING MECHANISM

(76) Inventor: Tom Kusic, P.O. Box 932, GoPo Melbourne VIC. (AU), 3001

( * ) Notice: Subject to any disclaimer, the term of this patent is extended or adjusted under 35 U.S.C. 154(b) by 0 days.

(21) Appl. No.: 10/174,976

(22) Filed: Jun. 20, 2002

(65) Prior Publication Data

US 2002/0195522 A1 Dec. 26, 2002

(30) Foreign Application Priority Data

Jun. 20, 2001 (AU) .............................................. PR5830

(51) Int. Cl.$^7$ ............................. B64C 3/38; B64C 39/00
(52) U.S. Cl. .................. 244/75 R; 244/3.24; 244/3.29; 244/45 A
(58) Field of Search ............................. 244/3.24, 3.26, 244/3.29, 21, 34 A, 39, 45 A, 47, 75 R

(56) References Cited

U.S. PATENT DOCUMENTS

| 3,603,533 | A | | 9/1971 | Stripling |
| 4,565,340 | A | | 1/1986 | Bains |
| 4,964,593 | A | | 10/1990 | Kranz |
| 5,048,772 | A | | 9/1991 | Wisshaupt |
| 5,139,215 | A | * | 8/1992 | Peckham .................... 244/3.21 |
| 5,176,338 | A | * | 1/1993 | Silich ........................... 244/39 |
| 5,322,243 | A | | 6/1994 | Stoy |
| 5,417,393 | A | * | 5/1995 | Klestadt ..................... 244/3.27 |
| 5,975,461 | A | | 11/1999 | Ullrich |

FOREIGN PATENT DOCUMENTS

| AU | 48730/99 | 3/2001 |
| IT | 588899 | 2/1959 |
| JP | 94/6-26799 | 2/1994 |

OTHER PUBLICATIONS

U.S. patent application Ser. No. 09/886,639, Tom Kusic, filed Dec. 27, 2001.

* cited by examiner

Primary Examiner—Robert P. Swiatek

(57) ABSTRACT

An airplane 1 with a spiral inducing assembly 2 which is capable of inducing the airplane to travel in a continuous spiralling motion without the airplane rolling. Two fins 6 and 17 are attached to a tube 3 that is able to rotate around the encircled part of the fuselage. The fins 6, 17 are able to rotate in a pivoting manner on the rotatable tube 3 with respect to the rotatable tube 3, thereby changing their pitch relative to the longitudinal axis of the rotatable tube 3. Fin 6 is larger than fin 17. The difference in sizes between the fins makes the larger fin 6 exert a greater force on the rotatable tube 3 than the smaller fin 17 when the fins are pitched in unison. The aerodynamic imbalance between the fins thus causes the rotatable tube 3 to rotate. When pitched at an angle to the longitudinal axis in unison, both fins 6, 17 would exert a lateral force on the rotatable tube 3. Thus, as well as forcing the rotatable tube 3 to rotate, the fins 6, 17 would also push the rotatable tube sideways. But as the rotatable tube is pushed sideways, it rotates, and hence the lateral direction of push constantly revolves, causing a spiralling motion of the airplane when in flight.

13 Claims, 22 Drawing Sheets

AIRPLANE SPIRALLING MECHANISM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

This invention is related to the field of aviation dealing with military attack aircraft.

The aim of this invention is to provide an airplane that has higher chance of surviving attacks from anti-aircraft weapons when flying over enemy territory than airplanes currently in use. The airplane according to this invention is fitted with a mechanism that enables the airplane to travel in a continuous spiralling motion while flying over enemy teritorry, without the need for the pilot to make continues control adjustments. The mechanism is such that once activated, the spiralling motion is automatic. The mechansim can aslo be dis-engaged by the pilot when so desired. The spiralling motion is achieved during flight without rolling the airplane.

While a pilot flying a conventional airplane such as a jet fighter could make the conventional airplane fly in a spiralling motion, this could only be achieved if the pilot kept making continuous control changes with his own arm. This could become quite tiresome and strenuous after a while and would require continued concentration, if the spiralling was achieved without rolling the airplane. Rolling the airplane, as in the form of a barrel roll, may seem like an easy alternative, but continuous rolling would make the pilot disey after a while, leading to loss of control, and if close to the ground, a potential for a crash. A continuous rolling motion would also make it hard for the pilot to observe enemy territory, navigate and make target selection. That is, using a sustained rolling motion in order to achieve a prolonged spiralling motion would not be practical.

The airplane in this invention would allow the pilot to operate conventional controls in a conventional manner, as when flying in a smooth manner, while the airplane continued to travel in a spiralling motion. The advantage of this is that the pilot would be able to continue to observe enemy territory and would be free to concentrate on targeting enemy sites while the airplane flew in an evasive manner.

2. Description of the Related Art

U.S. Pat. No. 5,322,243 in the name of Stoy shows a missile with variable pitch fins on a rotatable tube that are moved by independent actuators, and a computer to control the operation of the actuators. While the intention of Stoy wasn't to provide a missile that could travel in a continuous spiralling motion, such a motion could be achieved by the missile shown in Stoy's patent with appropriate programming of the controlling computer. The current invention provides a mechanical means for inducing a spiralling motion in an airplane that does not need a computer to control the position of the fins on a rotatable tube to induce a spiralling motion in the airplane.

BRIEF SUMMARY OF THE INVENTION

In this invention the spiralling motion of a fast flying airplane is achieved by using moveable fins on a rotatable tube, with the tube encircling a part of the airplane (preferrably the forward part of the fuselage) and able to rotate around the encircled part of the airplane.

The fins are attached to the rotatable tube so that they can be rotated in a pivoting manner relative to the rotatable tube. That is, if the rotatable tube was kept in a fixed position on the airplane so as not to rotate, the fin movement would resemble the movement of canards on airplane such as the Eurofighter and the recent version of the Sukhoi Su-30. The fins would turn in a pitch altering motion in the same direction. With the fins horizontal, the airplane would be allowed to fly smoothly. When the fins are rotated from the horizontal position, they would act to push the airplane in a similar manner to the way that canards would (if positioned on the forward part of the fuselage).

For the airplane to enter a spiralling motion, the fins would need to revolve around the body of the airplane so that the airplane is pushed in changing directions. In the invention this achieved by using the rotatable tube, that allows the fins to revolve around the fuselage of the airplane—using the rotatable tube as means of travelling around a part of the fuselage of the airplane. The invention provides a number of means by which rotation of the rotatable tube can be achieved. One way is to use fins that are of unequal size with respect to one another. Having fins that are of unequal size would cause an aerodynamic imbalance when the fins are moved from the horizontal position. With one fin pushing harder than the other, rotation of rotatable tube would result. The rotation of the rotatable tube would be automatic and continuous while the imbalance between the fins was maintained. Placing the fins back in a horizontal position would remove the imbalance, allowing the rotatable tube to come to rest. Friction between the airplane and the rotatable tube or a braking mechanism such as a hydraulicly activated brake pad being push against the rotatable tube could help to stop the rotatable tube from rotating.

Another way of causing the rotatable tube to rotate according to the invention is to increase the pitch of one fin more than that of the other. Increasing the pitch of one fin relative to the other would cause an aerodynamic imbalance on the rotatable tube, thereby forcing it to rotate. Allowing the fins to return to a horizontal position would remove the aerodynamic imbalance, allowing the rotatable tube to come to rest.

Although the airplane could be in the form of a jet propelled airplane, it could be in the form of any one of a range of airplanes such as turbo-props.

BRIEF DESCRIPTION OF THE SEVERAL VIEWS OF THE DRAWINGS

Embodiments of the invention will now be described by way of example with reference to the accompanying drawings, of which.

DETAILED DESCRIPTION OF THE DRAWINGS

Figure 1:
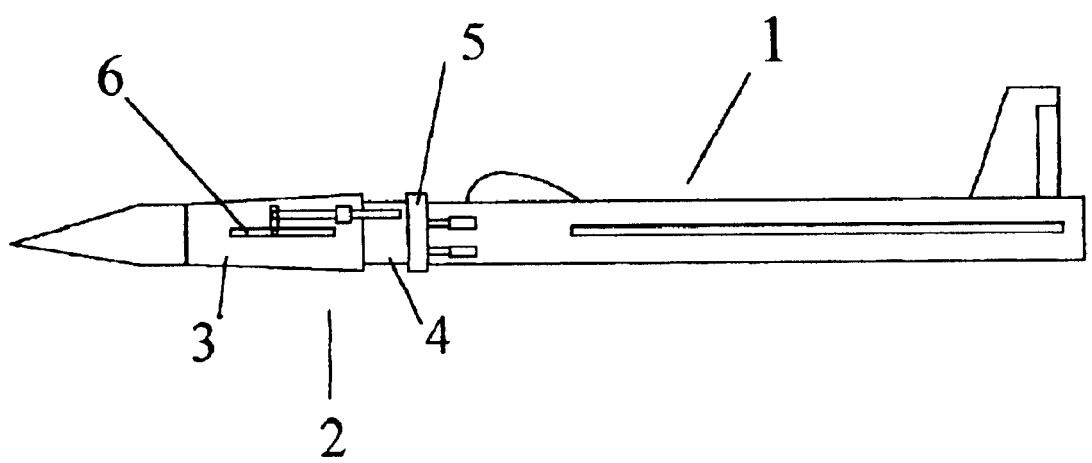
FIG. 1 shows the left side view of an airplane with a spiral inducing assembly.

FIG. 1 shows one form of the airplane 1 as a jet propelled airplane 1, fitted with a spiral inducing assembly 2.

Referring to FIG. 1, a rotatable tube 3 forming part of the spiral inducing assembly 2 can be seen encircling part of the fuselage 4 of the airplane 1. The fuselage has a fore end and aft end. Referring to this tube 3 as the primary tube 3, the primary tube 3 is able to rotate around the part of the fuselage encircled by the primary tube. The primary tube is shown as being narrower in the front than at the rear. Also shown is another tube 5 that is fitted to the airplane such that it encircles part of the fuselage 4 of the airplane. Referring to this tube 5 as the activation tube 5, the activation tube 5 is fitted so that it can be moved in a forward direction relative to the part of the fuselage 4 encircled by the activation tube and then back to its original position on the fuselage. FIG. 1 also shows the edge of one horizontal fin 6 that is connected to the outside of the primary tube 3. The fin 6 is connected to the outside of primary tube 3 such that it can rotate in a pivoting manner as shown in FIG. 2.

Figure 1A:
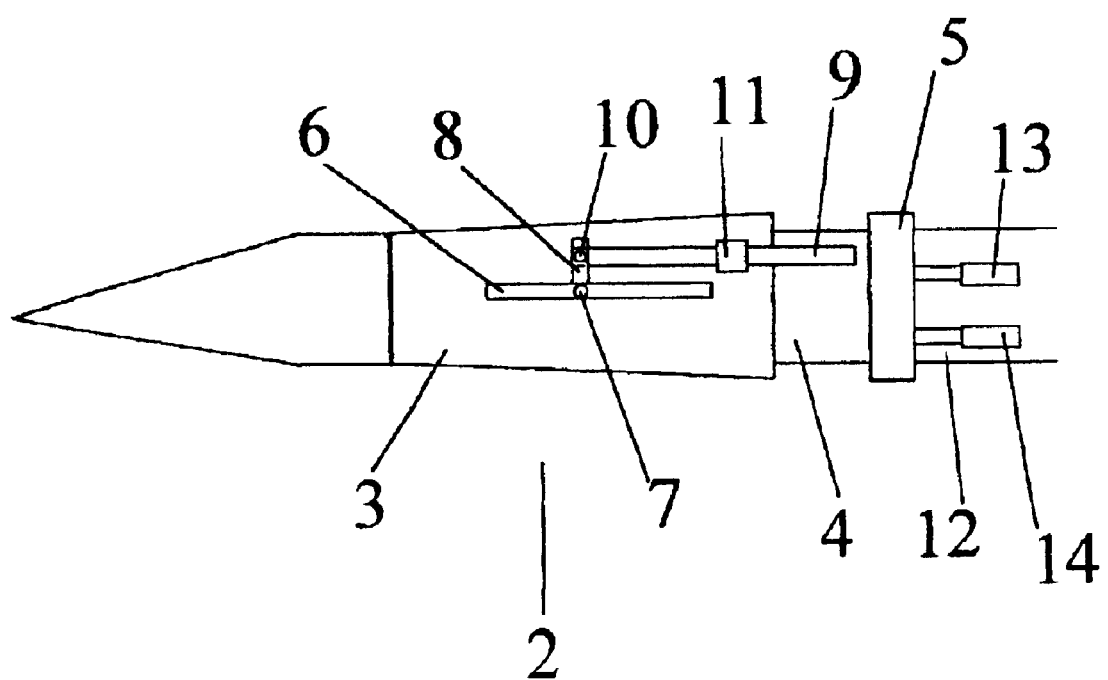
FIG. 1A shows an enlarged view of the spiral inducing assembly of FIG. 1.

FIG. 1A shows an enlarged illustration of the left side of the spiral inducing assembly 2. The fin 6 in FIG. 1A is connected to the outside of the primary tube 3 by a connecting joint which is in the form of a connecting rod 7. Extended from the connecting rod 7 in FIG. 1A is a protruding section 8 which is used to rotate the connecting rod 7. Rotation of the connecting rod 7 causes the fin 6 to rotate in a pivoting manner around the connecting rod 7 (in the manner shown in FIG. 2). Linked to the protruding section 8 in FIG. 1A is a stem 9. Referring to this stem 9 as an activation stem 9, the activation stem 9 is used as a means for pushing the protruding section 8 such that when the protruding section 8 is pushed, the protruding section 8 forces the connecting rod 7 to rotate around the longitudinal axis of the connecting rod 7. The activation stem 9 is linked to the protruding section 8 by a rivet 10. The activation stem 9 is shown as being fitted on the outside of the primary tube 3 and is supported an the primary tube 3 by a retaining bracket 11. The retaining bracket 11 is rigidly joined to the primary tube but is channelled to allow the activation stem 9 to move longitudinally between the retaining bracket 11 and the primary tube 3. The activation stem 9 is allowed to protrude rearward from the primary tube so that it can be reached by the activation tube 5 when the activation tube 5 is moved forward on the fuselage 4. The activation tube 5 is forced to move forward by an activation mechanism 12 consisting of hydraulic actuators 13 and 14. FIG. 3 shows the hydraulic actuators 15 and 16 located on the right side of the spiral inducing assembly 2 which also form part of the activation mechanism 12 by which the acivation tube 5 is forced to move. When the hydraulic actuators 13 14 15 and 16 are forced to extend as hydraulic pressure is applied to them, they force the activation tube 5 to move forward as shown in FIG. 2. FIG. 2 shows that as the activation tube 5 is forced to move forward on the fuselage 4 when the hydraulic actuators 13 and 14 extend, it eventually makes contact with the activation stem 9. As the activation tube 5 is forced to move further forward, it pushes the activation stem 9 forward on primary tube. As the activation stem 9 is pushed forward, the activation stem pushes against the protruding section 8 and moves the protruding section 8, thereby rotating the fin 6 around the connecting rod 7 in a pivoting manner.

Figure 2:
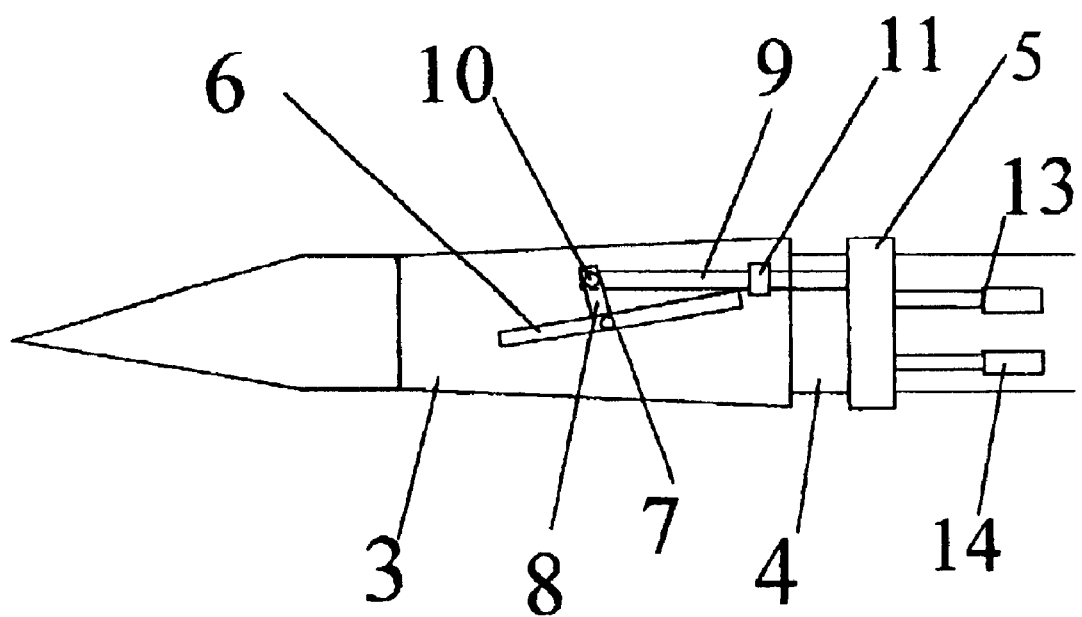
FIG. 2 shows the left side of the spiral inducing assembly of FIG. 1 after the spiral inducing assembly has been activated to cause a spiralling motion to occur.
Figure 3:
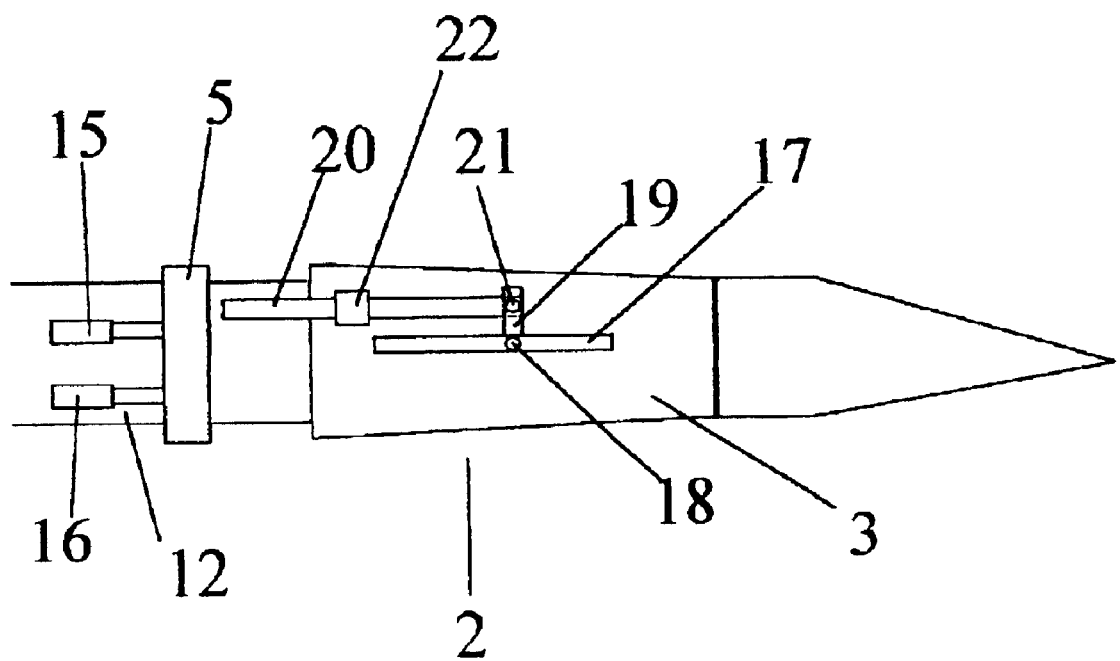
FIG. 3 shows the right side of the spiral inducing assembly of FIG. 1.

In FIG. 2 a rivet 10 is shown connecting the activation stem 9 to the protruding section 9, which allows movement between the activation stem 9 and the protruding section 8. The retaining bracket 11 keeps the activation stem from moving laterally around the primary tube. The retaining bracket 11 however does allow longitudinal sliding movement of the activation stem 9 so that it can be pushed and moved by the activation tube 5.

FIG. 3 shows the the right side of the spiral inducing assembly 2 of FIG. 1. Shown is another fin 17, another connecting joint 18 in the form of a connecting rod 18 that connects the fin 17 to the outside of the primary tube 3. Another protruding section 19 is used to rotate the connecting rod 18, and the activation stem 20 is used to push the protruding section 19, with the activation stem 20 linked to the protruding section 19 by a rivet 21. Also visible in FIG. 3 is the activation tube 5. The connecting rod 18 allows the fin 17 to rotate in a pivoting manner. Another retaining bracket 22 is shown supporting the respective activation stem 20.

Thus, it can be seen from FIGS. 1, 1A, 2 and 3 that the activation tube 5, the activation stems 9 and 20, retaining brackets 11 and 22, protruding sections 8 and 19, rivets 10 and 21 used to connect the activation stems 9 and 20 to respective protruding sections 8 and 19, the connecting joints 7 and 18 in the form of connecting rods 7 and 18, and the activation mechanism 12 used to move the activation tube 5 consisting of the hydraulic actuators 13, 14, 15 and 16, collectively form a fin rotating mechanism.

Figure 4:
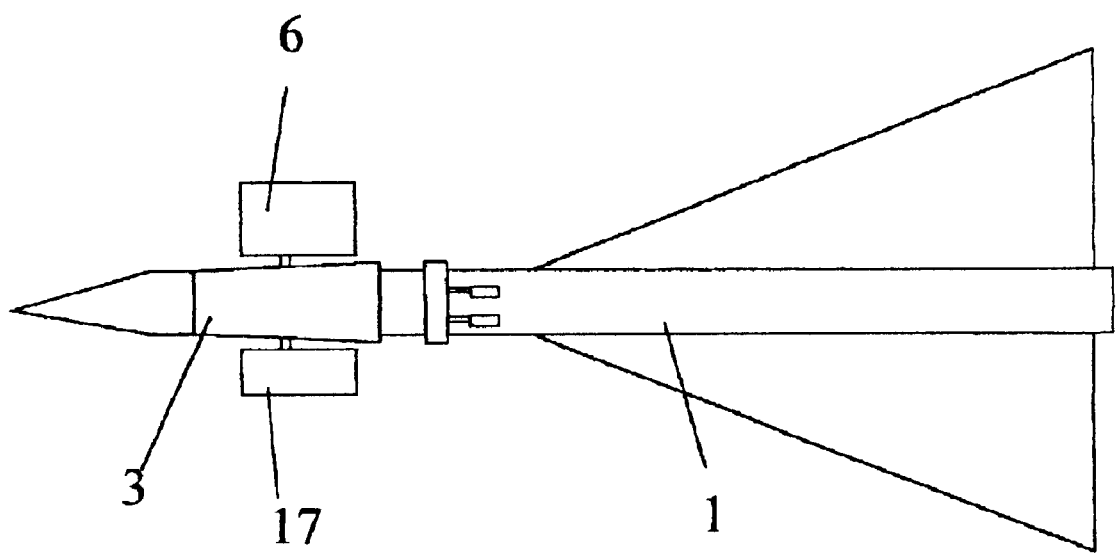
FIG. 4 shows the airplane of FIG. 1 as viewed from underneath the airplane.

FIG. 4 shows the airplane 1 of FIG. 1 from underneath. It shows that one fin 6 is larger than the other fin 17. When these fins 6 and 17 are rotated in a pivoting manner and in the same direction to the same extent, an aerodynamic imbalance between the fins 6 and 17 arises during flight of the airplane because of size difference between the fins 6 and 17. The larger fin 6 will exert a greater magnitude of force on the primary tube 3 during flight of the airplane 1 than the smaller fin 17. As a result, the aerodynamic imbalance between the fins 6 and 17 would cause the primary tube 3 to rotate. But both fins 16 and 17 would also be pushing the airplane laterally, in a similar manner to canards. Thus, because the primary tube 3 is forced to rotate, the lateral force exerted on the airplane by the fins 6 and 17 keeps changing, thus forcing the airplane to keep changing its direction and hence entering a spiralling motion.

Figure 5:
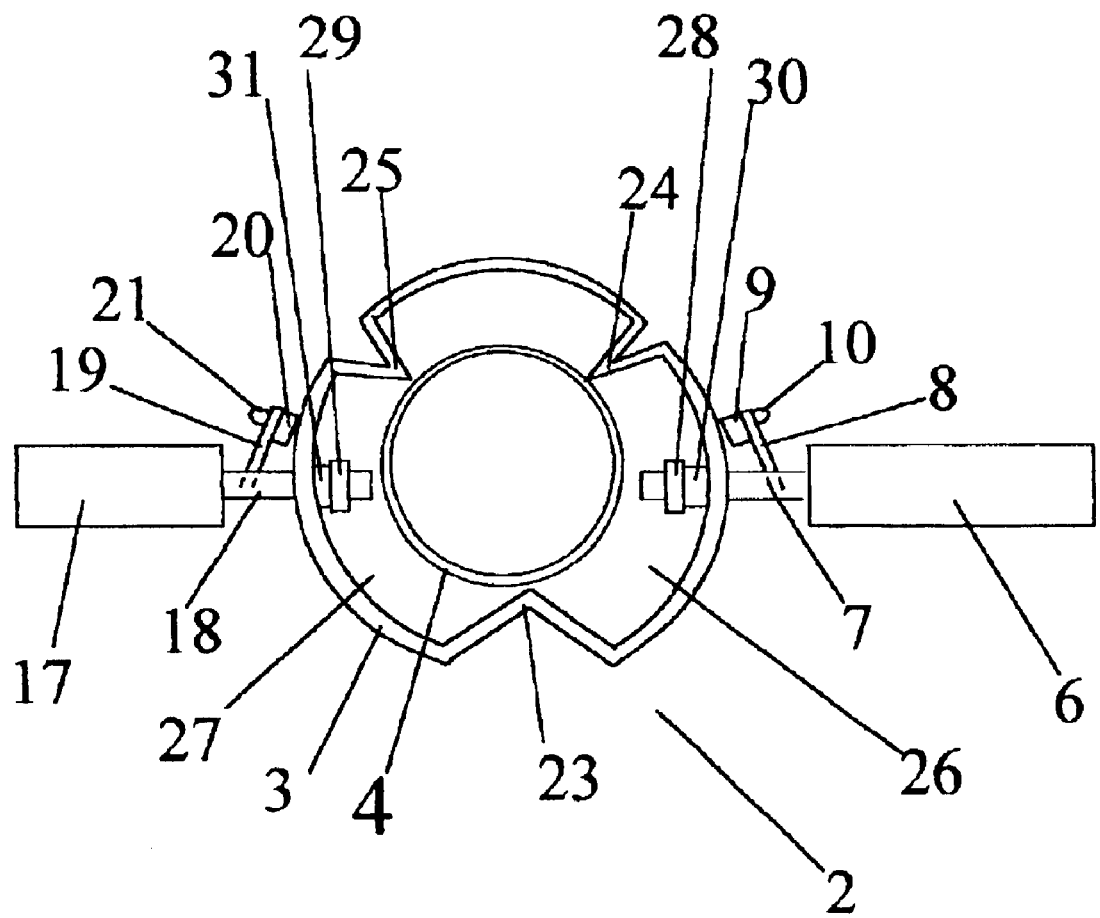
FIG. 5 shows a cross-sectional view of the spiral inducing assembly of FIG. 1 as viewed from the front of the airplane.

FIG. 5 shows the front cut out of the spiral inducing assembly 2 of FIG. 1. Shown here is the primary tube 3, the fins 6 and 17, (with fin 6 being larger than fin 17), the fuselage 4 of the airplane, the activation stems 9 and 20, linked by rivets 10 and 21 to the protruding sections 8 and 19 respectively, the connecting rods 7 and 18 penetrating the primary tube 3, and with the protruding sections 8 and 19 screwed in the connecting rods 7 and 18 respectively. FIG. 5 shows the primary tube 3 as being creased in sections 23, 24 and 25. The creased sections 23, 24 and 25 are used as a means to support the primary tube 3 on the on the encircled part of the fuselage 4, while allowing for gaps 26 and 27 to exist between the primary tube 3 and the encircled part of the fuselage 4. The gaps 26 and 27 allow the connecting rods 7 and 18 to protrude inwardly through the primary tube 3 without making contact with the encircled part of the fuselage 4. Securing bolt nuts 28 and 29 are shown securing the connecting rods 7 and 18 to the primary tube 3, with thrust bearings 30 and 31 allowing for easy rotation of the connecting rods 7 and 18 around their respective longitudinal axes'.

Figure 6:
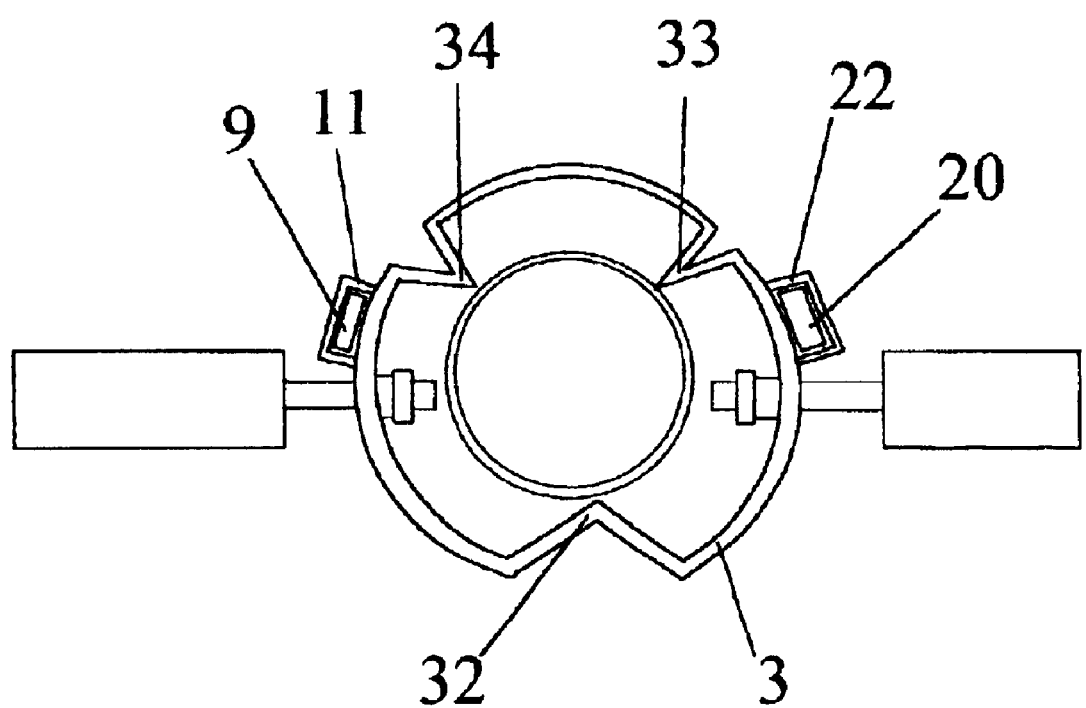
FIG. 6 shows a cross-sectional view of the spiral inducing assembly as viewed from behind the spiral inducing assembly.

FIG. 6 shows the rear of the primary tube 3 of FIG. 1 as a cut out. Shown in FIG. 6 are the rear ends of the activation stems 9 and 20, and the retaining brackets 11 and 22 that support the activation stems 9 and 20, and prevent uncontrolled lateral movement of the activation stems 9 and 20. The primary tube 3 is shown as having sections creased 32, 33 and 34.

The primary tube can be formed in various geometric shapes, including cylindrical or cone shaped.

Figure 7:
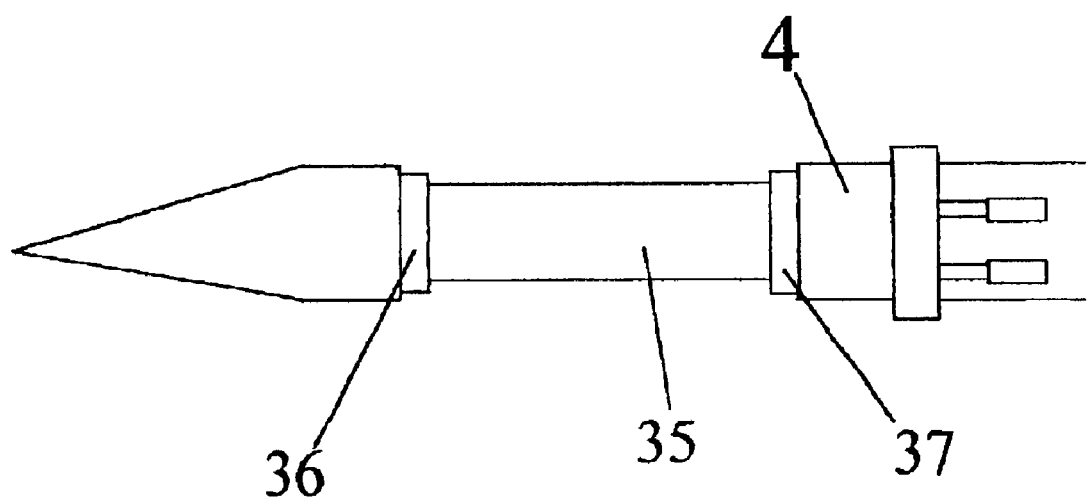
FIG. 7 shows the left side of the front of the fuselage of the airplane of FIG. 1.

FIG. 7 shows a side cutting of the part of the fuselage 35 encircled by the primary tube 3 of FIG. 1. The encircled part of the fuselage 35 can be seen to be narrower than the rest of the fuselage 4. Thrust bearings 36 and 37 are positioned on the narrowed section of fuselage 35. The thrust bearings are used to support the primary tube and to prevent the primary tube moving longitudinally relative to the fuselage 4.

Figure 8:
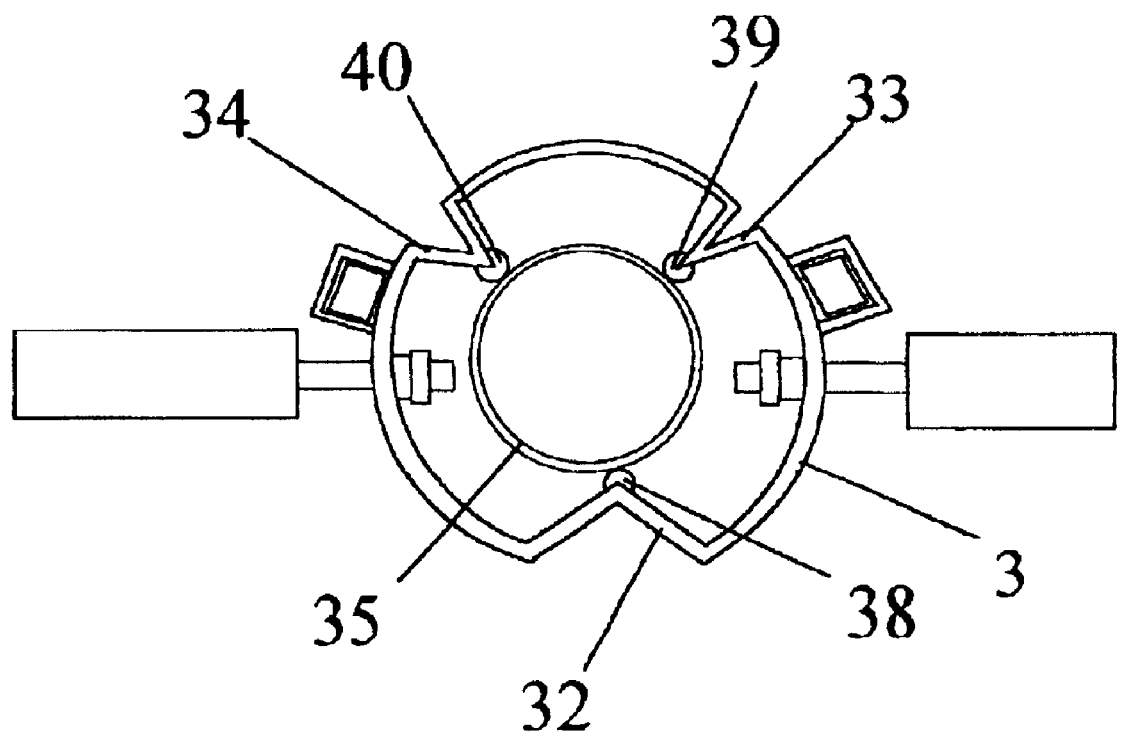
FIG. 8 shows a cross-sectional view of a spiral inducing assembly comprising a creased rotatable tube with wheels on the creased sections of the rotatable tube.

FIG. 8 shows another way that the primary tube 3 of FIG. 6 can be supported, with wheels 38, 39 and 40 attached to the creased sections 32, 33 and 34 of the primary tube 3. The wheels 38, 39 and 40 help to support the primary tube 3 on the encircled part of the fuselage 35.

Figure 9:
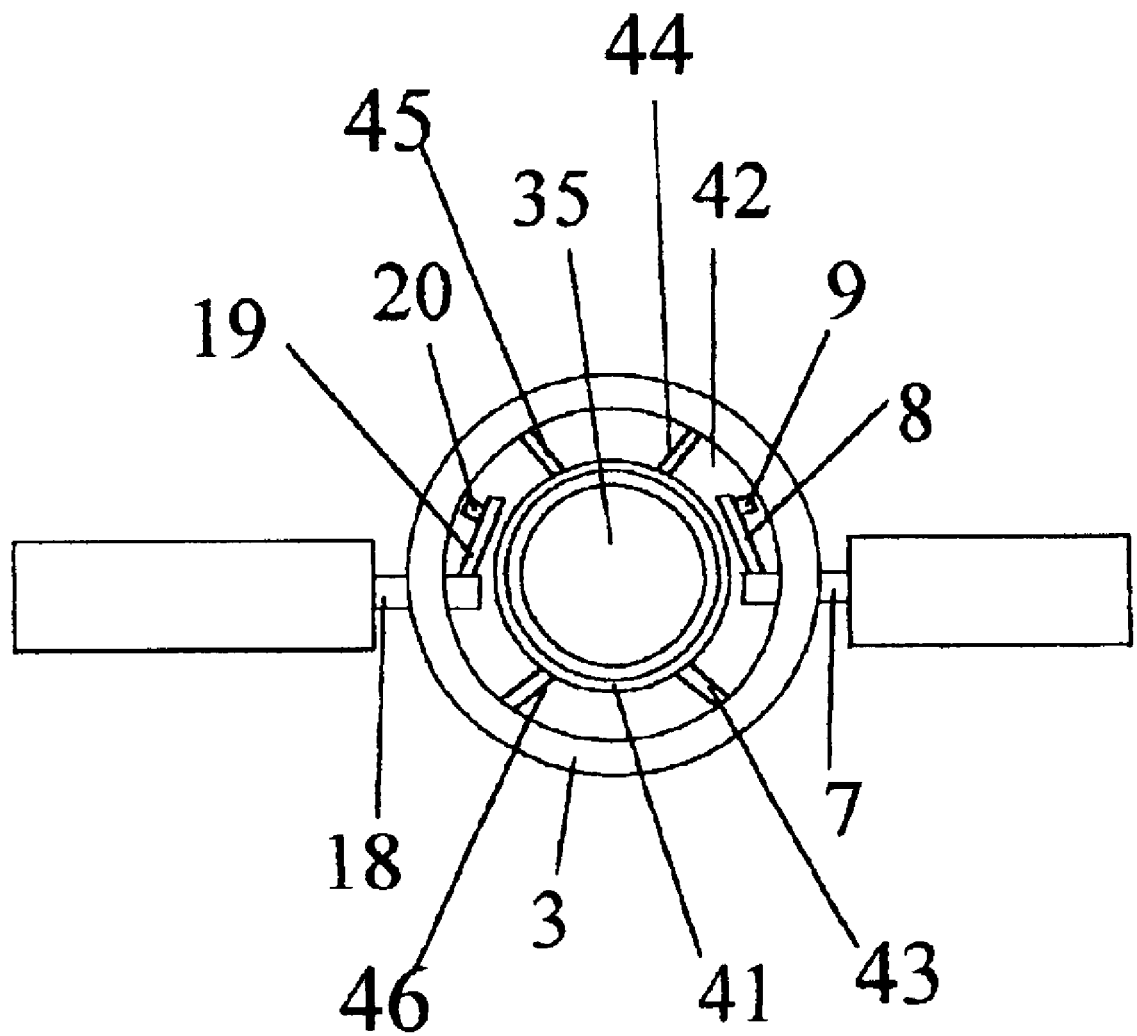
FIG. 9 shows cross-sectional view of a spiral inducing assembly comprising two rotatable tubes rigidly joined together, with one tube being positioned within the other, and both encircling the fuselage, and with moveable components positioned between the two rotatable tubes.

FIG. 9 shows another way of supporting the primary tube 3. Shown is a tube of smaller diameter 41 than the primary tube 3. This smaller tube 41 is a supporting tube 41 in that it can be used to support the primary tube 3. It has a smaller diameter than the primary tube 3 to provide a gap 42 between the primary tube 3 and the supporting tube 41. The gap 42 is used to allow freedom of movement to the protruding sections 8 and 19, and the activation stems 9 and 20 shown positioned inside the primary tube 3. The protruding sections 8 and 19 and the connecting rods 7 and 18 have been formed as moulded units, allowing easier assembly. Bolts 43, 44, 45 and 46 are used to join the primary tube 3 to the supporting tube 41. The supporting tube 41 is able to rotate around the encircled part of the fuselage 35.

Figure 9A:
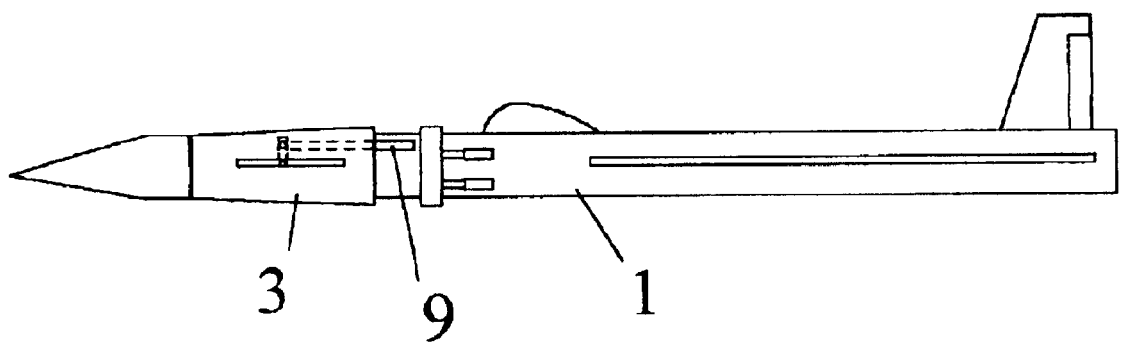
FIG. 9A shows a left side view of an airplane comprising a spiral inducing assembly as described in respect of FIG. 9.

FIG. 9A shows a side view of an airplane 1 using the fin rotating mechanism of FIG. 9. The activation stem 9 of FIG. 9 can be seen to be protruding rearward from inside the primary tube 3.

Figure 10:
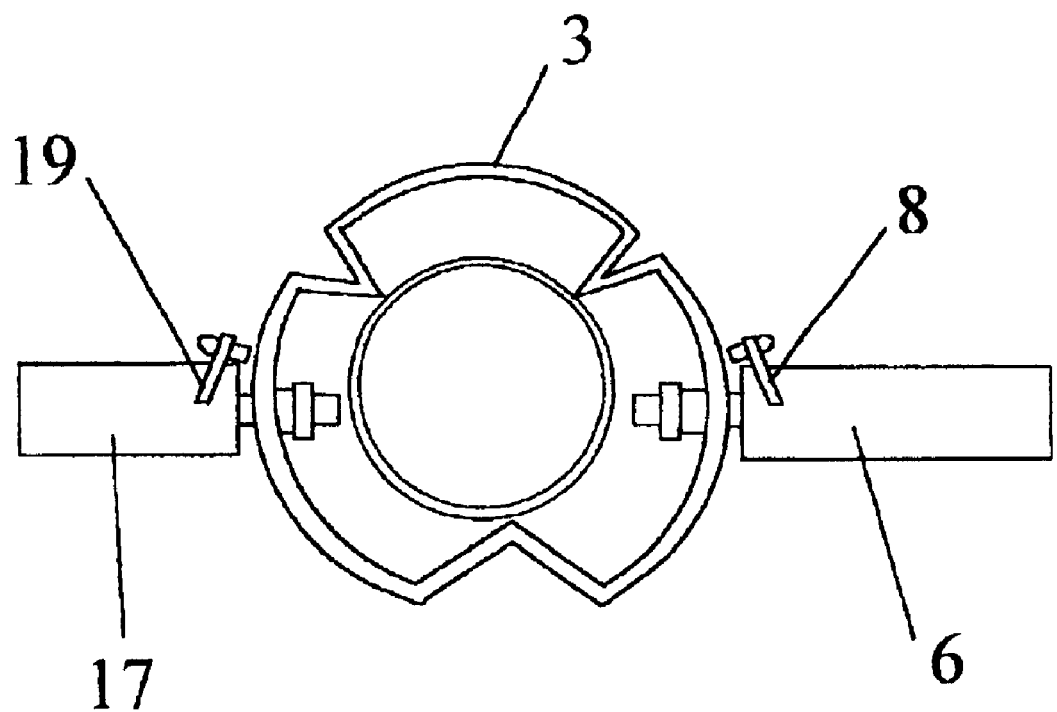
FIG. 10 shows a cross-sectional view of the front of a spiral inducing assembly with protruding sections protruding from fins.

FIG. 10 shows a cut out of the front of the primary tube 3 of FIG. 1, but with the protruding sections 8 and 19 protruding from the fins 6 and 17 respectively.

Figure 11:
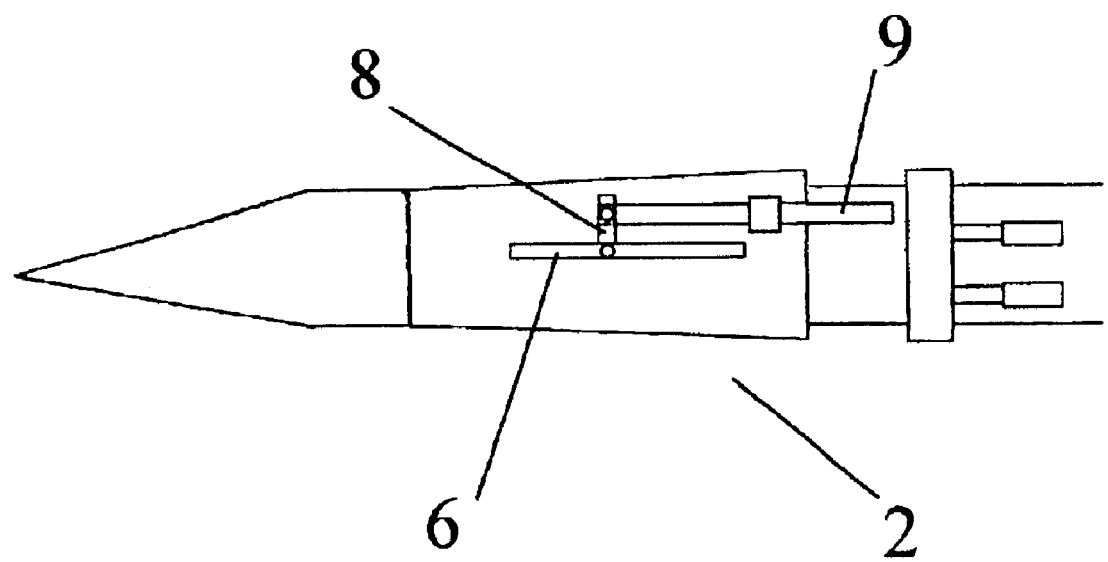
FIG. 11 shows the left side of a spiral inducing assembly with a protruding section that is shorter than the protruding section that appears in FIG. 12.
Figure 12:
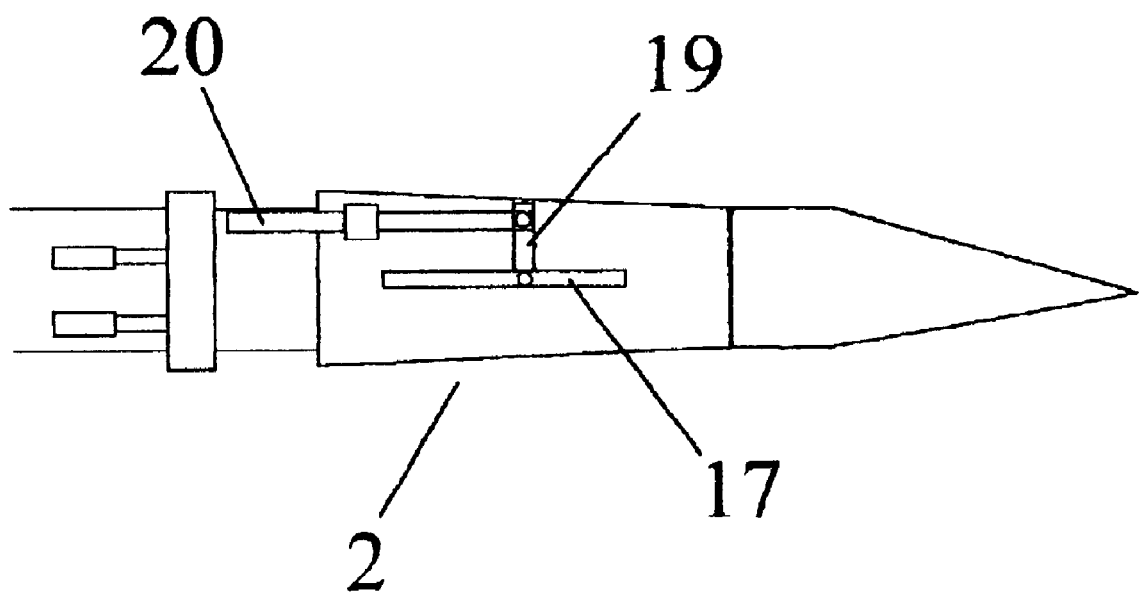
FIG. 12 shows the right side of the spiral inducing assembly of FIG. 11 with a protruding section in FIG. 12 that is longer than the protruding section shown in FIG. 11.

FIGS. 11 and 12 show another manner in which the aerodynamic imbalance between the fins can be created during forward flight.

In FIG. 11 the protruding section 8, on the left side of the spiral inducing assembly 2 is shorter than the protuding section 19 in FIG. 12 on the right side of the spiral inducing assembly 2. The shorter protruding section 8 would generate a greater degree of movement of fin 6 in FIG. 11 than the movement of fin 17 that the protruding section 19 would cause in FIG. 12 for an equal movement in the respective activation stems 9 and 20. An aerodynamic imbalance between the fins could thus be created.

Figure 13:
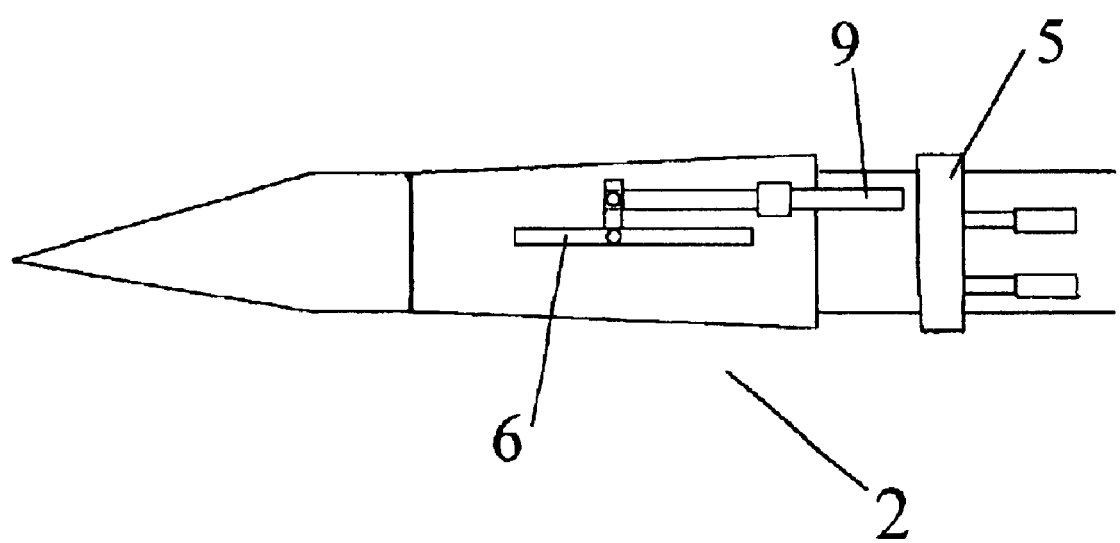
FIG. 13 shows the left side of a spiral inducing assembly with an activation stem that is longer than the activation stem that appears in FIG. 14.
Figure 14:
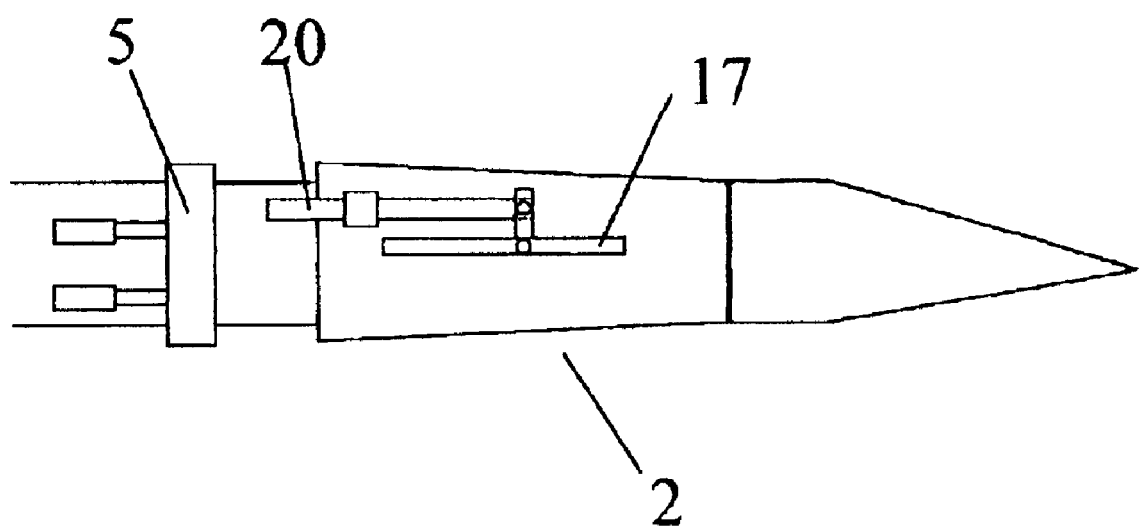
FIG. 14 shows the right side of the spiral inducing assembly of FIG. 13 with an activation stem in FIG. 14 that is shorter than the activation stem shown in FIG. 11.

FIGS. 13 and 14 show the left and right sides of the spiral inducing assembly 2 of another arrangement for creating an aerodynamic imbalance between the fins 6 and 17. FIG. 14 shows the activation stem 20 on the right side as being shorter than the activation stem 9 on the left side in FIG. 13. Hence when the activation tube 5 is moved forward, it first starts pushing the activation stem 9 in FIG. 13, forcing fin 6 to rotate, and then when the activation tube 5 later starts pushing the activation stem 20 of FIG. 14, the activation tube 5 will continue pushing the longer activation stem 9 of FIG. 13, forcing the fin 6 in FIG. 13 into a higher degree of rotation, or pitch, than fin 17 of FIG. 14, at all times until both fins are allowed to become horizontal again by the activation tube 5 being allowed to retreat.

Figure 15:
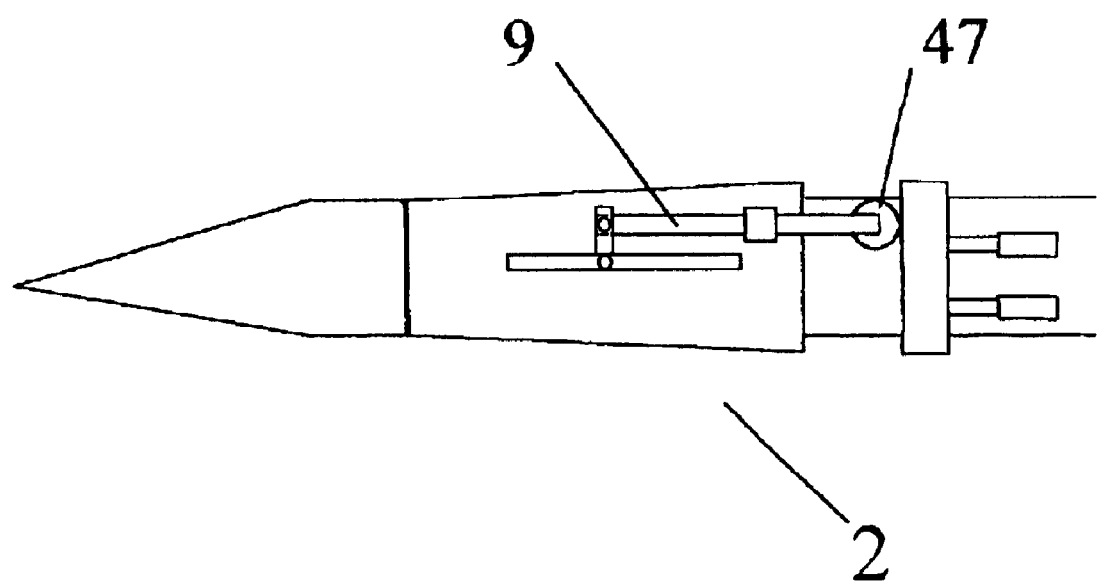
FIG. 15 shows the left side of a spiral inducing assembly with a wheel connected to an activation stem.

FIG. 15 shows a spiral inducing assembly 2 with a wheel 47 fitted to the activation stem 9. The wheel 47 would reduce frictional forces between the activation stem 9 and the activation tube 5 as the activation stem travels around the activation tube 5 when the primary tube is rotating.

Figure 16:
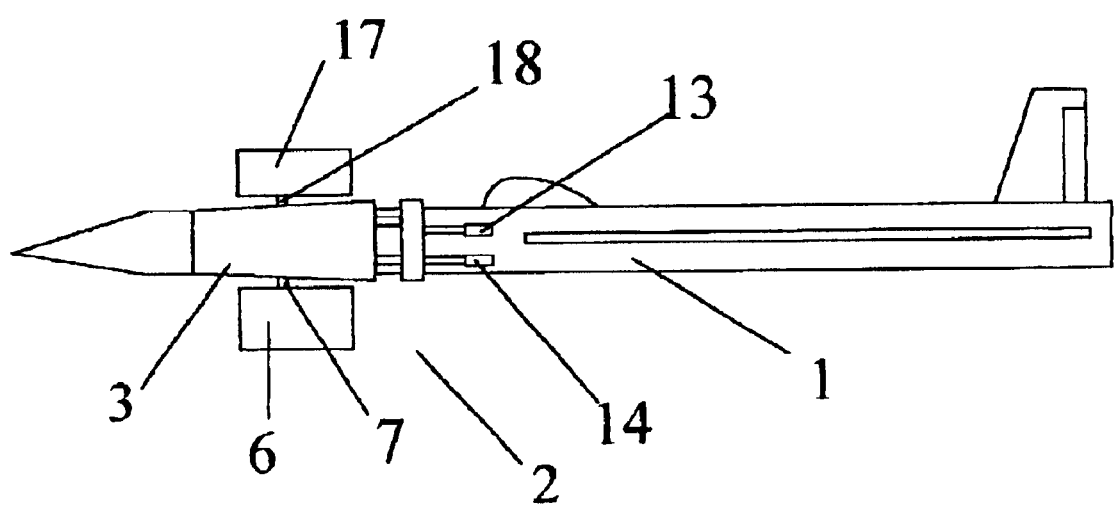
FIG. 16 shows the spiral inducing assembly of FIG. 4 in an activated state, and after the rotatable tube has been rotated.

FIG. 16 shows the spiral inducing assembly of FIG. 4 with the fins 6 and 17 of FIG. 4, and with the primary tube 3 in a state of rotation. It can be seen comparing FIG. 4 with FIG. 16 how the lateral forces on the airplane would be constantly changing, enabling the spiral inducing assembly 2, to force the airplane 1 to travel in a continuous spiralling motion.

Looking at the fins 6 and 17 shown in FIG. 16 it can be seen that the rear section of each fin behind the respective connecting rods 7 and 18 is greater than the section of each fin in front the respective connecting rods 7 and 18. This is deliberate. This is used to allow the fins to adopt a horizontal position when hydraulic pressure is released from the hydraulic actuators 13, 14 (and 15 and 16 of FIG. 3) allowing the activation tube 5 to retreat away from the primary tube 3. Aerodynamic forces are in effect used to allow the fins to return to a resting horizontal position, allowing the airplane to re-commence a smooth non-spiralling flight. Friction between the activation tube 5 and activation stems 9 and 20 caused by the rotation of the activation stems 9 and 20 around the activation tube (since the activation stems rotate with the primary tube) can be used as a means of slowing the rotation of the primary tube when smooth flight is desired. The braking mechanisms shown in FIGS. 17 and 18 could also be used as a means of slowing the primary tube when smooth flight needs to be resumed.

Figure 17:
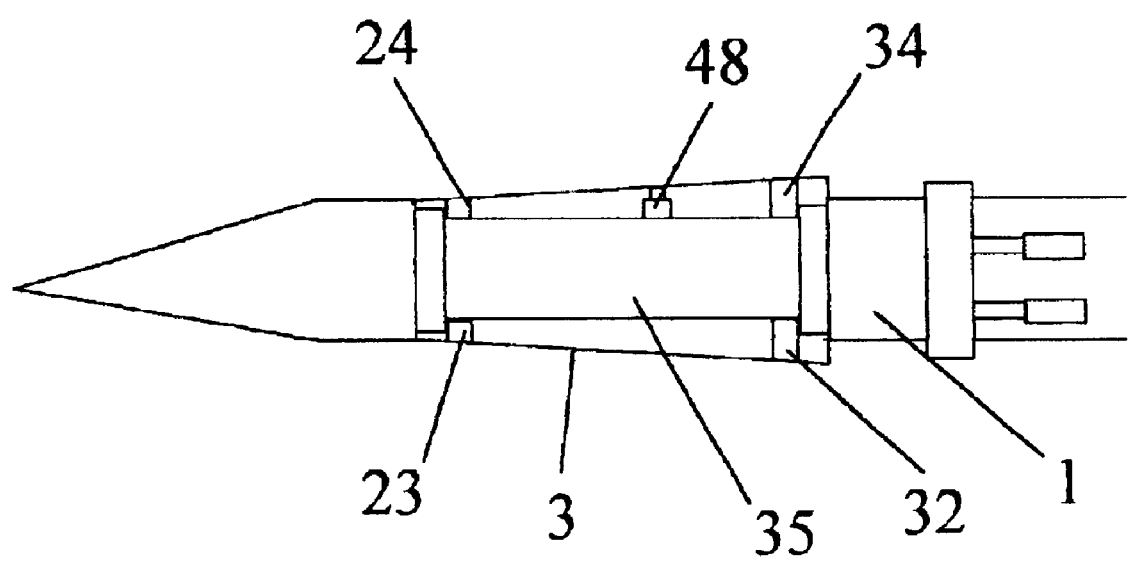
FIG. 17 shows a cross-sectional view of the front of the airplane of FIG. 1 with a hydraulic actuator attached to the fuselage which hydraulic actuator can restrict the rate of rotation of a rotatable tube that forms part of a spiral inducing assembly.

FIG. 17 shows a side cutting of the primary tube 3 and the part of the fuselage 35 encircled by the primary tube 3. Shown here is a hydraulic actuator 48 attached to the encircled part of the fuselage 35, in an extended form. Extended it creates friction on the primary tube 3 and acts as a brake to help slow the primary tube 3 when the spiral inducing assembly is de-activated. Using a braking system lightly would allow the primary tube 3 to rotate, but would intensify the lateral forces on the airplane. To allow use of a braking mechanism, the primary tube 3 would be kept smooth and round in the area that fricion is induced. Any creased sections 23, 24, 32, 34 would be restricted to areas where the hydraulic actuator 49 would not make contact.

Figure 17A:
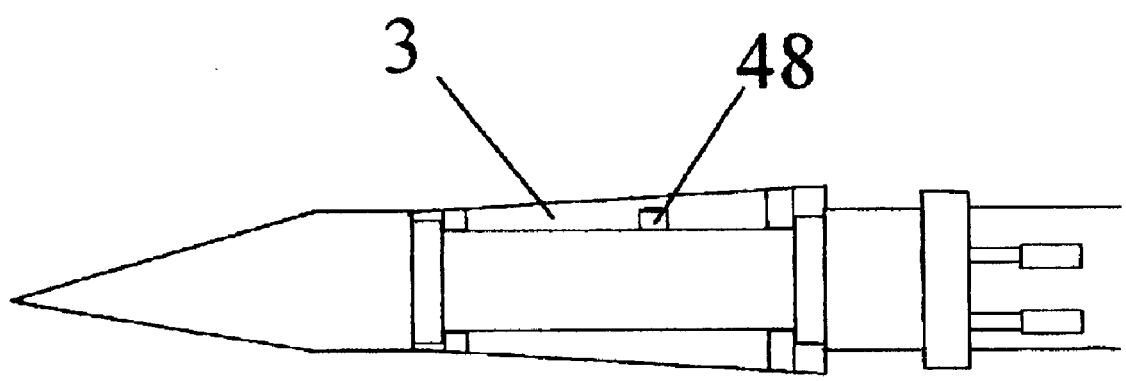
FIG. 17A shows the hydraulic actuator of FIG. 17 in a compressed state.

FIG. 17A shows the hydraulic actuator 48 in a compressed state, as when the primary tube 3 is allowed to freely rotate.

Figure 18:
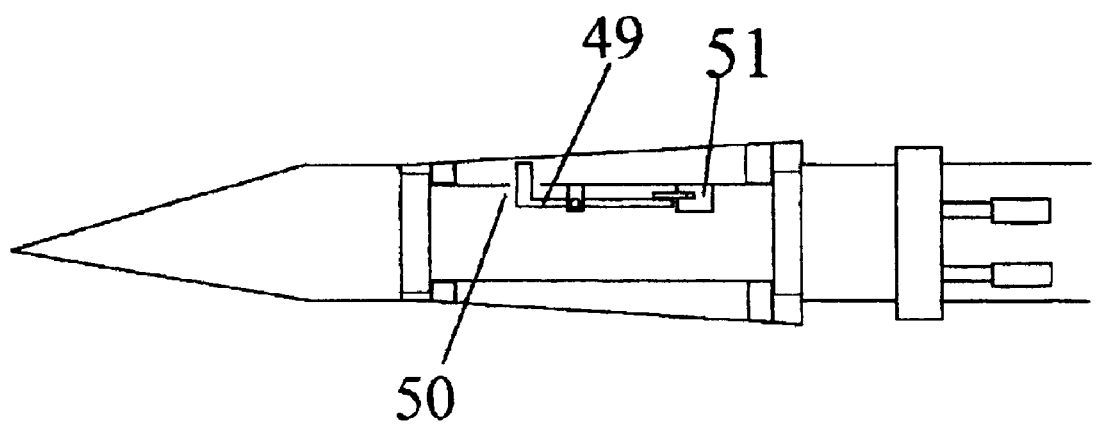
FIG. 18 shows a lever being used to restrict the rate of rotation of a rotatable tube tha forms part of a spiral inducing assembly.

FIG. 18 shows another braking mechanism where a lever is used to slow the primary tube. The lever 49 is shown protruding from a hole 50 in the fuselage, and is operated by an actuator in the form of an electric motor 51.

Figure 19:
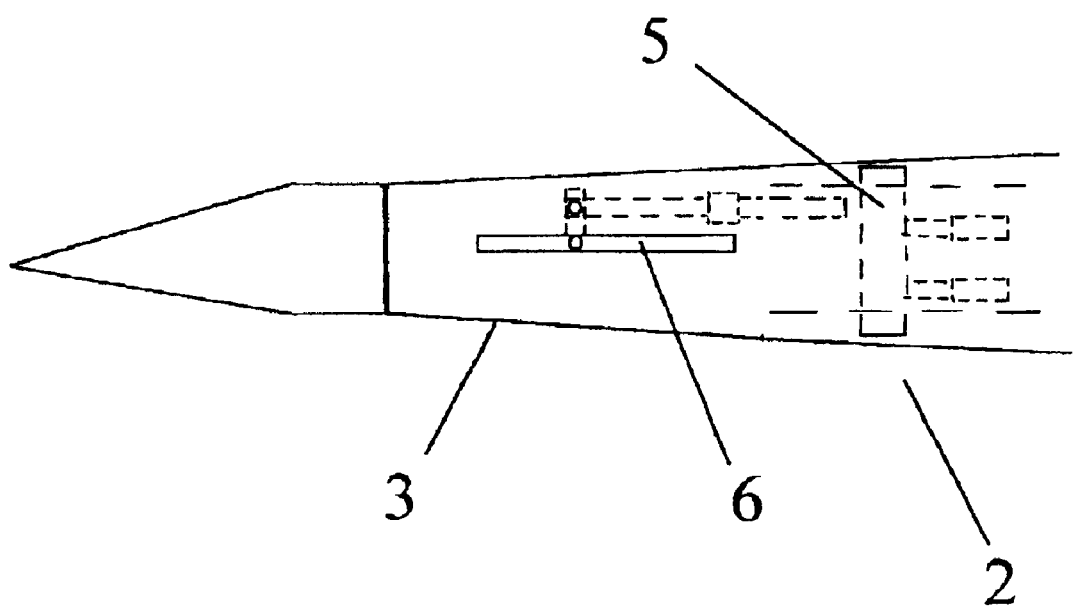
FIG. 19 shows a spiral inducing assembly with a rotatable tube that extends over an activation tube.

FIG. 19 shows a spiral inducing assembly 2 where the primary tube 3 extends over the activation tube 5, but the fin is located on the outside of the primary tube.

What is claimed is:

1. An airplane comprising a fuselage and a spiral inducing assembly, which said spiral inducing assembly is capable of forcing the airplane to travel in a spiralling motion during flight of the said airplane, and which said spiral inducing assembly consists of a tube, which said tube encircles part of the fuselage of the airplane and which said tube is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction, with a stem connected to one fin and another stem connected to another fin, and with an additional tube encircling part of the fuselage of the airplane, which fuselage comprises as a fore end and an aft end, and which said additional tube is able to move between the fore end and the aft end of the fuselage, with at least one hydraulic actuator connected to the fuselage, which at least one hydraulic actuator is connected to the fuselage such that the at least one hydraulic actuator is able to push the additional tube and force the additional tube to move between the fore end and the aft end of the fuselage, such that as the additional tube is moved the additional tube can be pressed against the said stems, such that as the additional tube presses against the stems, the respective fins are rotated in a pivoting manner with respect to the tube that is able to rotate relative to the fuselage, with the stems of such relative lengths with respect to one another and with the stems connected to the respective fins such that the said fins can be rotated in the said pivoting manner and in the same direction as each other such that one of the said fins can be pivotally rotated to a greater degree relative to the tube that is able to rotate relative to the fuselage than can another of the said fins be rotated relative to tube that is able to rotate relative to the fuselage.

2. The airplane of claim 1 wherein the said stems are positioned such that they extend longitudinally with respect to the fuselage of the airplane.

3. The airplane of claim 1 wherein the additional tube is in the form of a ring.

4. The airplane of claim 1 wherein an additional hydraulic actuator is connected to the fuselage of the airplane, which additional hydraulic actuator is connected to the fuselage such that as hydraulic pressure is applied to the additional hydraulic actuator, the additional hydraulic actuator is able to be pressed against the tube that is able to rotate around the fuselage of the airplane such that friction can be induced between the additional hydraulic actuator and the tube that is able to rotate around the fuselage of the airplane.

5. The airplane of claim 1 wherein a lever is connected to the fuselage of the airplane, which lever is connected to the fuselage such that the lever is able to be pressed against the tube that is able to rotate around the fuselage of the airplane such that friction can be induced between the lever and the tube that is able to rotate around the fuselage of the airplane.

6. An airplane comprising a fuselage and a spiral inducing assembly, which said spiral inducing assembly is capable of forcing the airplane to travel in a spirally motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction, and which said spiral inducing assembly comprises a fin rotating mechanism by which fin rotating mechanism the said fins can be rotated in the said pivoting manner, and by which said fin rotating mechanism the said fins can be rotated in the said pivoting manner and simultaneously in the same direction as each other such that during flight of the said airplane one of the said fins connected to the tube can continuously exert a greater magnitude of force on the said tube than can another of the said fins that is connected to the said tube, with a hydraulic actuator connected to the fuselage of the airplane, which hydraulic actuator is connected to the fuselage such that as hydraulic pressure is applied to the hydraulic actuator, the hydraulic actuator is able to be pressed against the tube that is able to rotate around the fuselage of the airplane such that friction can be induced between the hydraulic actuator and the tube that is able to rotate around the fuselage of the airplane.

7. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction, and which said spiral inducing assembly comprises a fin rotating mechanism by which fin rotating mechanism the said fins can be rotated in the said pivoting manner, and by which said fin rotating mechanism the said fins can be rotated in the said pivoting manner and simultaneously in the same direction as each other such that during flight of the said airplane one of the said fins connected to the tube can continuously exert a greater magnitude of force on the said tube than can another of the said fins that is connected to the said tube, with a lever connected to the fuselage of the airplane, which lever is connected to the fuselage such that the lever is able to be pressed against the tube that is able to rotate around the fuselage of the airplane such that friction can be induced between the lever and the tube that is able to rotate around the fuselage of the airplane.

8. An airplane comprising a fuselage and a spiral inducing assembly. which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and which said spiral inducing assembly comprises a fin rotating mechanism by which fin rotating mechanism the said fins can be rotated in the said pivoting manner such that during flight of the said airplane one of the said fins connected to the tube can continuously exert a greater magnitude of force on the said tube than can another of the said fins that is connected to the said tube, with a hydraulic actuator connected to the fuselage of the airplane, which hydraulic actuator is connected to the fuselage such that as hydraulic pressure is applied to the hydraulic actuator, the hydraulic actuator is able to be pressed against the tube that is able to rotate around the fuselage of the airplane such that friction can be induced between the hydraulic actuator and the tube that is able to rotate around the fuselage of the airplane.

9. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and which said spiral inducing assembly comprises a fin rotating mechanism by which fin rotating mechanism the said fins can be rotated in the said pivoting manner such that during flight of the said airplane one of the said fins connected to the tube can continuously exert a greater magnitude of force on the said tube than can another of the said fins that is connected to the said tube, with a lever connected to the fuselage of the airplane, which lever is connected to the fuselage such that the lever is able to be pressed against the tube that is able to rotate around the fuselage of the airplane such that friction can be induced between the lever and the tube that is able to rotate around the fuselage of the airplane.

10. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction, and which said spiral inducing assembly comprises a fin rotating mechanism by which said fin rotating mechanism the said fins can be rotated in the said pivoting manner and in the same direction as each other, and by which said fin rotating mechanism the said fins thus can be rotated in the said same direction relative to the tube such that one of the said fins connected to the tube can be rotated to a greater degree relative to the tube than can another of the said fins that is connected to the said tube, with a hydraulic actuator connected to the fuselage of the airplane, which hydraulic actuator is connected to the fuselage such that as hydraulic pressure is applied to the hydraulic actuator, the hydraulic actuator is able to be pressed against the tube that is able to rotate around the fuselage of the airplane such that friction can be induced between the hydraulic actuator and the tube that is able to rotate around the fuselage of the airplane.

11. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction, and which said spiral inducing assembly comprises a fin rotating mechanism by which said fin rotating mechanism the said tins can be rotated in the said pivoting manner and in the same direction as each other, and by which said fin rotating mechanism the said fins thus can be rotated in the said same direction relative to the tube such that one of the said fins connected to the tube can be rotated to a greater degree relative to the tube than can another of the said fins that is connected to the said tube, with a lever connected to the fuselage of the airplane, which lever is connected to the fuselage such that the lever is able to be pressed against the tube that is able to rotate around the fuselage of the airplane such that friction can be induced between the lever and the tube that is able to rotate around the fuselage of the airplane.

12. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of the fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction and in unison relative to the tube and which said spiral inducing assembly comprises a fin rotating mechanism by which said fin rotating mechanism the said fins can be rotated in the said pivoting manner in the same direction as each other and in unison relative to the tube and with the said fins being such that during flight of the said airplane one of the said fins connected to the tube can continuously exert a greater magnitude of force on the said tube than can another of the said fins that is connected to the said tube, with a hydraulic actuator connected to the fuselage of the airplane, which hydraulic actuator is connected to the fuselage such that as hydraulic pressure is applied to the hydraulic actuator, the hydraulic actuator is able to be pressed against the tube that is able to rotate around the fuselage of the airplane such that friction can be induced between the hydraulic actuator and the tube that is able to rotate around the fuselage of the airplane.

13. An airplane comprising a fuselage and a spiral inducing assembly, which said spiral inducing assembly is capable of forcing the airplane to travel in a spiralling motion during flight of the said airplane, and which said spiral inducing assembly consists of a tube, and which said tube encircles part of the fuselage of the airplane and is able to rotate relative to the encircled part of tha fuselage, with a plurality of fins connected to the said tube, which said fins are connected to the tube such that the fins protrude laterally outward from the tube and such that the said fins can be rotated in a pivoting manner relative to the tube, and such that the said fins can be rotated in the said pivoting manner in the same direction and in unison relative to the tube and which said spiral inducing assembly comprises a fin rotating mechanism by which said fin rotating mechanism the said fins can be rotated in the said pivoting manner in the same direction as each other and in unison relative to the tube and with the said fins being such that during flight of the said airplane one of the said fins connected to the tube can continuously exert a greater magnitude of force on the said tube than can another of the said fins that is connected to the said tube, with a lever connected to the fuselage of the airplane, which lever is connected to the fuselage such that the lever is able to be pressed against the tube that is able to rotate around the fuselage of the airplane such that friction can be induced between the lever and the tube that is able to rotate around the fuselage of the airplane.

\* \* \* \* \*